United States Patent [19]
Eshel et al.

[11] Patent Number: 5,940,840
[45] Date of Patent: Aug. 17, 1999

[54] PHANTOM FILES FOR DYNAMIC READ BANDWIDTH MEASUREMENTS OF COMPUTER DISKS

[75] Inventors: Marc Eshel, San Jose, Calif.; Martin Gerhard Kienzle, Briarcliff Manor, N.Y.; Daniel Lloyd McNabb, Los Gatos, Calif.; Raymond Edward Rose, Purdys, N.Y.; Frank Bernhard Schmuck, Campbell, Calif.

[73] Assignee: International Business Machines Corporation, Armonk, N.Y.

[21] Appl. No.: 08/859,359

[22] Filed: May 20, 1997

[51] Int. Cl.$^6$ ............................................. G06F 17/30
[52] U.S. Cl. ............................ 707/205; 707/2; 707/101
[58] Field of Search ................................ 707/2, 101, 205

[56] References Cited

U.S. PATENT DOCUMENTS

| 5,255,136 | 10/1993 | Machado et al. | 360/77.02 |
| 5,410,671 | 4/1995 | Elgamal et al. | 395/425 |
| 5,463,772 | 10/1995 | Thompson et al. | 707/101 |
| 5,721,956 | 2/1998 | Martin et al. | 395/872 |

FOREIGN PATENT DOCUMENTS

| 0167826 A2 | 1/1986 | European Pat. Off. | G11B 23/40 |
| 0466296 A2 | 1/1992 | European Pat. Off. | G11B 20/18 |
| 0774715 A1 | 5/1997 | European Pat. Off. | G06F 11/14 |

OTHER PUBLICATIONS

Roger Haskin, Frank Schmuck: The Tiger Shark File System, Proceedings of the IEEE Computer Society International Computer Conference—Compcon Spring '96, 1996, p. 3.

Prabhad K. Andleigh: UNIX System Architecture. Prentice–Hall, Inc. Englewood Cliffs, New Jersey 07632, 1990, ISBN 0–13–949843–5, pp. 122–124, 210.

Maurice Bach: The Design of the UNIX Operating System, Prentice–Hall, Inc. Englewood Cliffs, New Jersey07632, 1986, ISBN 201799–7, pp. 84–88.

Guenter von Zadow: CMS File System in Release 2 of VM 370 Basic System Extensions. IBM World Trade system Centers, 1979, Report ZZ10–9892–00, p. 36.

Marc M. Eshel, Patrick Ryall: CMS File Level Commit. IBM Technical Disclosure Bulletin Jun. 1989, pp. 266–268.

Cho, Jinsung et al., "Scheduling Video Streams in a large–scale video–on–demand server", Parallel Computing, vol. 23 (May 1997), pp. 1743–1755.

(List continued on next page.)

*Primary Examiner*—Wayne Amsbury
*Assistant Examiner*—Shahid Alam
*Attorney, Agent, or Firm*—Kevin M. Jordan

[57] ABSTRACT

An improved method for supporting an empirical measurement of the data bandwidth that one or more computer disks can continuously sustain while reading data. In a computer system having predetermined workload requirements and disk storage for storing an allocation table including entries for meta blocks and data blocks, a method for supporting a dynamic measurement of the read bandwidth of a disk, includes the steps of: creating an alternate allocation table that ignores the existing content of the disk; creating meta blocks for a phantom file by allocating the meta blocks from the allocation table; allocating data blocks for the phantom file from the alternate allocation table; and writing only meta blocks to the disk, but not actual data blocks. Since the actual data blocks are by far the largest component of the files, phantom files require only a very small number of disk blocks, and can be written very quickly. Since the creation of the alternate allocation table ignores the existing content of the disk, disks can be used regardless of their current content and without modifying this content. Further, a disk can be calibrated by reading phantom files—using all system components including hardware and software—in the same way that the application for which the calibration is intended would read ordinary files thereby avoiding any artifacts resulting from the measurement of the read bandwidth.

16 Claims, 8 Drawing Sheets

OTHER PUBLICATIONS

Curtis Abbott, "Efficient Editing of Digital Sound on Disk", J. Audio Eng. Soc., vol. 32, No. 6, Jun. 1984, pp. 394–402.

Mohan, C., "Disk Read–Write Optimizations and Data Integrity in Transaction Systems Using Write–Ahed Logging", Proceeding of the Eleventh International Conference on Data Engineering, IEEE Mar. 1995, pp. 324–331.

Sriram, K., "Dynamic Bandwidth Allocation and Congestion Control Schemes For Voice And Data Multiplexing in Wideband Packet Technology" International Conference on Communications, IEEE Apr. 1990, vol. 3, pp. 1003–1009.

Seltzer, Margo et al., "Read Optimized File System Designs: APerformance Evaluation", Proceeding of Seventh International Conference on Data Engineering, IEEE Apr. 1991, pp. 602–611.

Zhou, Han et al., "A Dynamic Bandwidth allocation Scheme For Multimedia Data Over ATM Networks", Proceedings of International Conference on Network Protocols, IEEE Nov. 1995, pp. 32–39.

PHANTOM FILES FOR DYNAMIC READ BANDWIDTH MEASUREMENTS OF COMPUTER DISKS

I. BACKGROUND OF THE INVENTION a. Field of the Invention

The present invention is related to the support of the empirical measurement of the data bandwidth that one or more computer disks can continuously sustain while reading data. A more particular aspect of the present invention is related to a bandwidth calibration (or simply calibration) of one or more disks.

b. Related Art

An accurate measurement of disk bandwidth is necessary to provide performance guarantees in a system using the disk(s). One application to which these performance guarantees are especially important are real-time data streams with audio and video data that an application must receive in a timely manner for correct rendering of the audio and video. There are several existing methods for the calibration of disk bandwidth, each of which has disadvantages overcome by the present invention.

Theoretical calibration: Here, the bandwidth is inferred from design parameters such as rotational speed of disks, data transfer rates, buffer sizes, and controller speeds. Theoretical calibration assumes a model of the disk subsystem that correctly accounts for all relevant attributes, both in hardware and in software. In practice however, this is not possible due to the large number of parameters, and their interactions. Also, theoretical calibration must make worst-case assumptions, significantly underestimating the bandwidth. This results in uneconomic use of the disks.

Empirical calibration overcomes these problems. Empirical calibration measures an actual system under a real or simulated workload. Empirical calibration can be performed in a static or dynamic way.

Static calibration is performed once for all major component configurations before a system is taken into service. See Roger Haskin, Frank Schmuck: *The Tiger Shark File System*, Proceedings of the IEEE Computer Society International Computer Conference—COMPCON SPRING '96, 1996, p. 3, et seq. ("Haskin"). This implies that either a very large number of possible configurations must to be calibrated at great expense, or that the actual bandwidth of a configuration must be inferred from calibrations of similar configurations, which results in inaccurate bandwidth data.

Dynamic calibration implies that the disk bandwidth of the actual system is measured, at the time of manufacture (see Haskin). This process implicitly takes into account all relevant hardware and software components. It requires that an operational system at the service site can simulate the workload needed for calibration. This presents the following problem.

II. THE WORKLOAD PROBLEM FOR DYNAMIC CALIBRATION

To make sure that the workload in an empirical calibration is representative of a large range of possible workloads, the workload, and the files used in the calibration process must be designed carefully. For example:

Their disk blocks must be evenly distributed over all the disks that are part of the disk subsystem to be calibrated. That is, each disk of the subsystem must have the same number of disk blocks belonging to a calibration file.

The locations of the data blocks on the disks must be carefully selected to avoid introduction of statistical artifacts.

The meta data of the files must have a structure identical to ordinary files, to avoid introducing artifacts.

Depending on the characteristics of the data streams, different kinds of calibration files are required.

This implies that special calibration files must be written onto the disk(s) to be calibrated to assure the correct properties. This requirement causes some problems:

1. The calibration files will have to be written. This is time consuming.
2. If disks have been in service, the disk locations required for the calibration files may not be available.
3. If new disks are added to an existing subsystem, some disks have blocks and others are empty. This makes it difficult to perform the block allocation needed for the calibration files.
4. For videos of different bandwidths and lengths, different calibration files are required.
5. The disks to be calibrated have to be empty so that all the disk blocks needed for calibration are available to the calibration files. This means that disks that have been in service and contain video data, have to be emptied before calibration can start.

III. SUMMARY

In accordance with the aforementioned needs the present invention is directed to an improved method for supporting an empirical measurement of the data bandwidth that one or more computer disks can continuously sustain while reading data.

According to one aspect of the present invention, in a computer system having predetermined workload requirements and disk storage for storing an allocation table including entries for meta blocks and data blocks, the present invention can dynamically measure a read bandwidth of a disk having existing stored user data without writing new data blocks to the disk.

According to another aspect of the present invention, in a computer system having predetermined workload requirements and disk storage for storing an allocation table including entries for meta blocks and data blocks, a method for supporting a dynamic measurement of the read bandwidth of a disk, includes the steps of: creating an alternate allocation table that ignores the existing content of the disk; creating meta blocks for a phantom file by allocating the meta blocks from the allocation table; allocating data blocks for the phantom file from the alternate allocation table; and writing only meta blocks to the disk, but not actual data blocks. Since the actual data blocks are by far the largest component of the files, phantom files require only a very small number of disk blocks, and can be written very quickly.

One advantage of the present invention flows from the creation of an alternate allocation table that ignores the existing content of the disk. When creating meta blocks for the phantom files, the real allocation table is used. To allocate data blocks for a phantom file, the alternate allocation table is used, ignoring any existing content but accounting for the space allocated for the phantom files meta information. Thus, disks can be used regardless of their current content and without modifying this content. This means that disks that contain video data do not have to be emptied before calibration files can be written. This makes it easier to re-calibrate the bandwidth of a disk subsystem after an existing configuration has been changed, for instance, by adding more disks.

According to still another aspect of the present invention, the above method, includes the additional step of calibrating the disk by reading phantom files—using all system components including hardware and software—in the same way that the application for which the calibration is intended would read ordinary files thereby avoiding any artifacts resulting from the measurement of the read bandwidth. In other words, for the purposes of reading files during the calibration process, a phantom file cannot be distinguished from an ordinary file. Therefore, all the components and algorithms ordinarily used for reading can be used during the calibration. Phantom files are treated differently from ordinary files only during their creation, which occurs before the calibration starts, and during deletion.

According to yet another aspect of the present invention, the file content used in the bandwidth measurement process is irrelevant to the measurement results. For example, during calibration, only the bandwidth is observed, but the content of the files is discarded. The phantom file of the present invention can thus use any data block on disk for calibration, whether it is empty or whether it is being used by any file on the disk. An ordinary file typically includes meta blocks and data blocks. The meta blocks contain, among other data internal to the file system, pointers to the data blocks on disk. The data blocks contain the actual file data. The number of meta blocks is very small compared to the number of data blocks. A phantom file has its own meta blocks, describing the file. But it can use any blocks on disk as its data blocks, whether the blocks are used by another file, or whether they are unallocated. As a result, the phantom files require very little disk space and can be overlaid on disks that are almost full or are completely empty. At the same time, the accurate representation of the workload by the calibration files enables an accurate measurement of the system's expected workload.

These features of the present invention provide several advantages, including:

The fast creation of different types of calibration files, according to the expected workload, for example, video files of different lengths and files implying different video data rates;

The creation of calibration files on disks that are in use. This implies that any disk in the set to be calibrated can either be completely empty, or partially occupied, to the point that almost all blocks are occupied by file data and metadata. This ability supports dynamic calibration when an existing disk configuration is expanded by adding new disks;

The calibration of a set of disks where not all disks share the same physical characteristics, resulting in different disk data bandwidths for individual disks; and The calibration of a set of disks with different degrees of storage utilization. This enables the calibration of disk sets where new, empty disks are added to an existing set that contains data.

BRIEF DESCRIPTION OF THE DRAWINGS

These and other features and advantages will become apparent from the following detailed description and accompanying drawings, wherein.

IV. DETAILED DESCRIPTION

Figure 1:
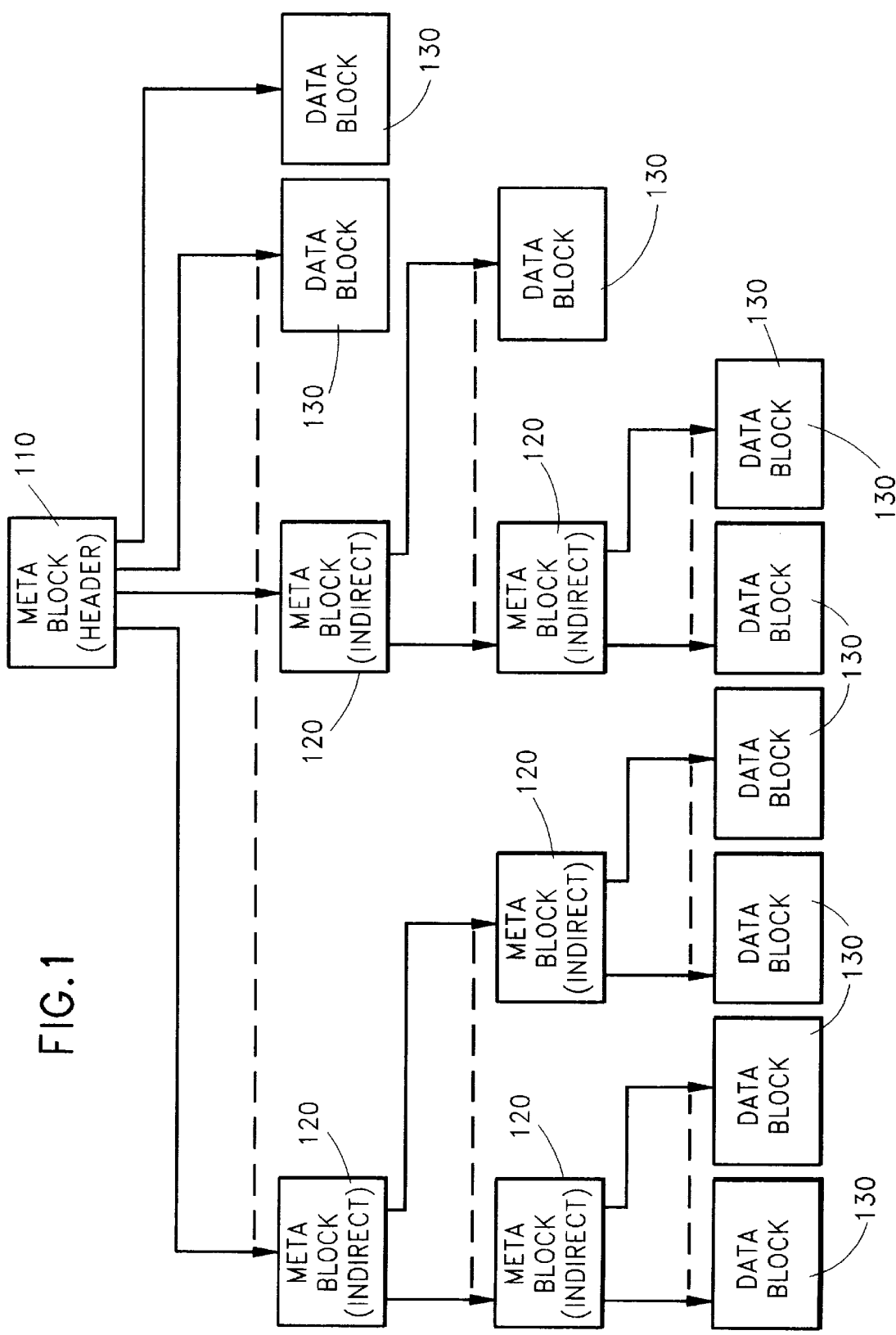
FIG. 1 depicts an example of the way many file systems implement their block structure on disk.

FIG. 1 depicts an example of the way many prior art file systems implement their block structure on disk. Some important features are: A header block (110) that contains file attributes pertaining to the entire file. Sometimes, this block is referred to as an I-node. The header block (110) can also contain pointers to indirect blocks (120) and possibly to data blocks (130);

Indirect blocks (120) that contain pointers to other meta blocks or to data blocks; and Data blocks (130) that contain the actual data a program can see when reading the file.

Header blocks (110) and indirect blocks (120) are meta blocks, i.e., they contain only data necessary for the file system's operation, but not the actual file data (that a program reading the file will receive). Examples of systems and various disk configurations for the measured file system will be discussed with reference to FIGS. 5a–5d.

Figure 2:
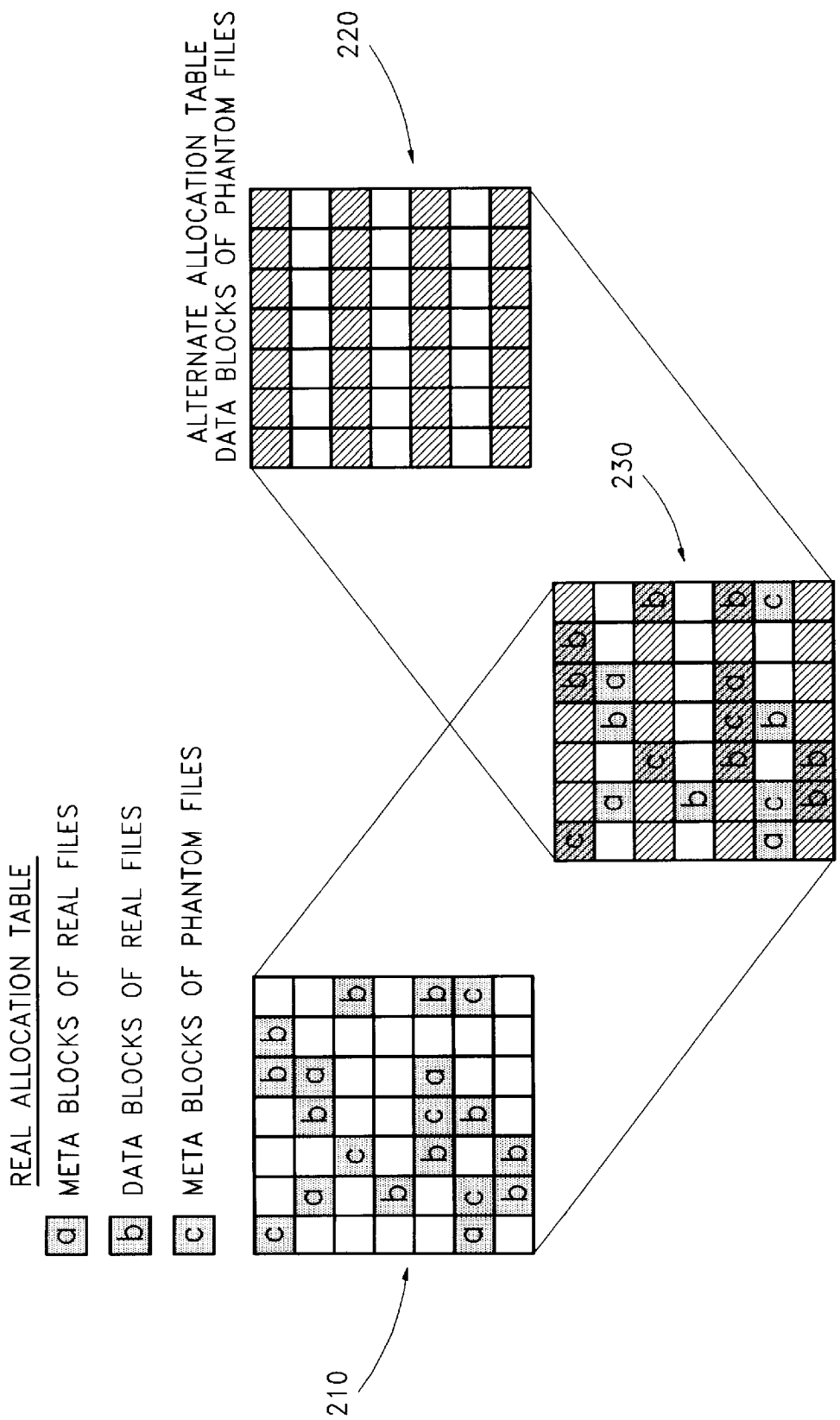
FIG. 2 depicts an example of a file system supporting phantom files in accordance with the present invention.

FIG. 2 depicts an example of logic for a file system supporting phantom files in accordance with the present invention. As depicted, a file system supporting phantom files requires two allocation tables (210, 220) for disk blocks. Each allocation table has one entry for each disk block, indicating whether this block has been allocated to a file or is free for use by new files. An allocation table may contain other information such as locks on disk blocks. Allocation tables for the management of disk blocks are well known in the art. See, e.g., Prabhad K. Andleigh; *UNIX System Architecture*, Prentice-Hall, Inc. Englewood Cliffs, N.J. 07632, 1990, ISBN 0-13-949843-5, pp. 122–124, 210; Maurice Bach: *The Design of the UNIX Operating System*, Prentice-Hall, Inc. Englewood Cliffs, N.J. 07632, 1986, ISBN 201799-7, pp. 84–88; Guenter von Zadow: *CMS File System in Release 2 of VM 370 Basic System Extensions*, IBM World Trade System Centers, 1979, Report ZZ10-9892-00, p. 36; and Marc M. Eshel, Patrick Ryall: *CMS File Level Commit*, IBM Technical Disclosure Bulletin, 06–89, pp. 266–268.

Allocation tables for disk blocks are typically stored on the disks whose block allocation they represent. Any type of allocation table can be used in the context of this invention. The real allocation table (210) manages data blocks of real files (b), and meta blocks of real files (a) and phantom files (c). An alternate allocation table (220) manages data blocks of phantom files only. Both allocation tables span the entire disk block space (230). All disk blocks have an entry in both allocation tables, and each disk block can be accessed through both tables (210, 220) simultaneously.

Figure 3A:
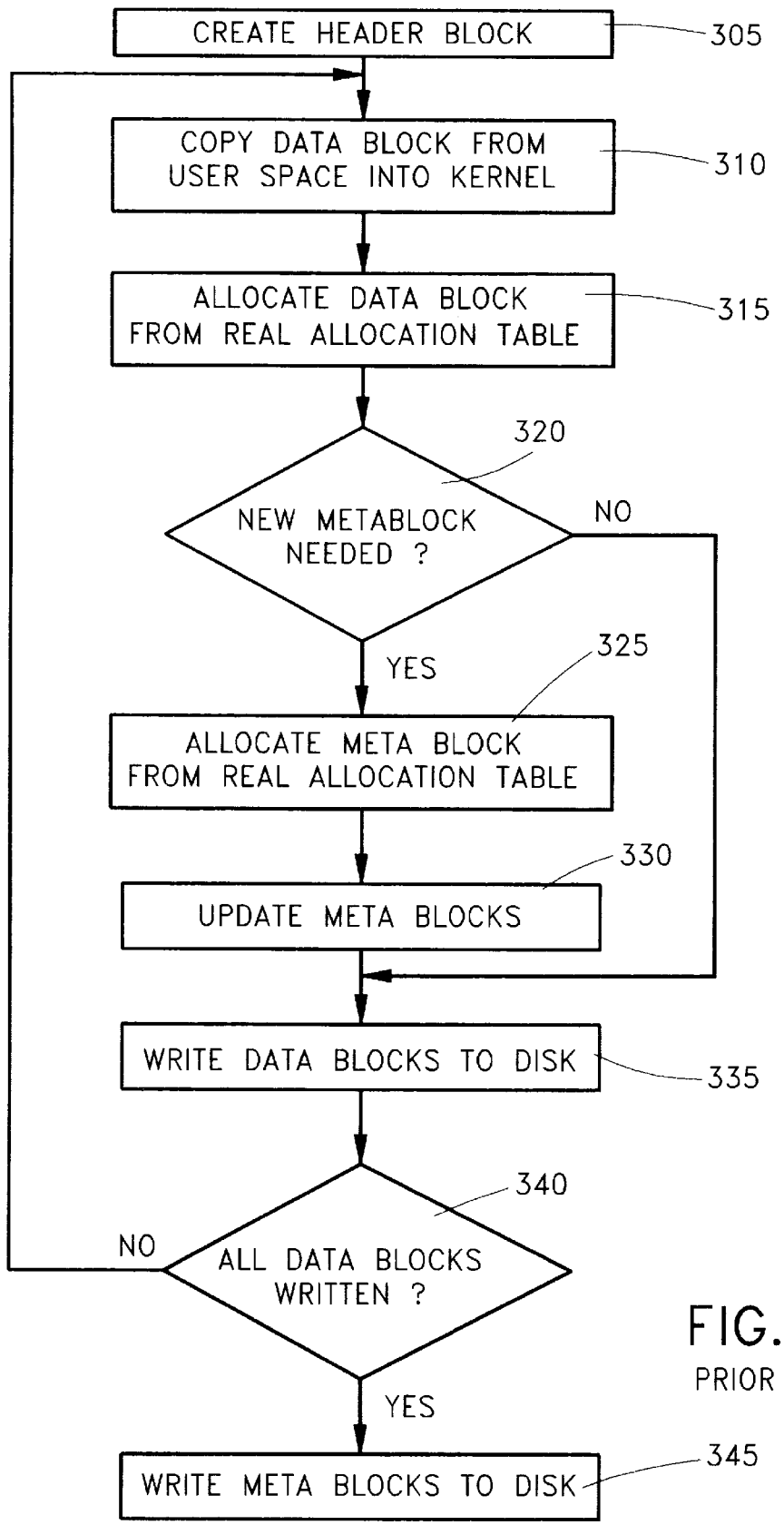
FIG. 3a depicts an example of a prior art method of creating an ordinary file and writing it onto the disk(s)

FIG. 3a depicts an example of a prior art process for creating an ordinary file. As depicted, in step 305, create the header block (110) for the file, containing all ordinary file attributes. In step 310, copy a data buffer from user space, where it has been prepared by a program, into kernel space for use by the file system. In step 315, allocate a data block (130) from the real allocation table (210). In step 320, determine whether the pointer to this data block can be stored in an already allocated and existing meta block (either the header block (110) or an indirect block (120)) or whether a new indirect block (120) must be allocated. In the former case, proceed to step 330, in the latter case, proceed to step 325. In step 325, allocate a new indirect block from the real allocation table (210) and insert it into the meta block structure. In step 330, update the appropriate meta block by inserting the pointer to the data block. In step 335, write the data block to disk. In step 340: determine whether there are data buffers left that must be written to disk data blocks. If this is the case, proceed to step 310. Otherwise, all data buffers of the file have been written to disk data blocks, and in step 345, write the header block (110) and the indirect blocks (120), if any, to disk. Now the operation of creating a new file on disk is complete. FIG. 1 shows an example of the structure of the blocks on disk after step 345.

Figure 3B:
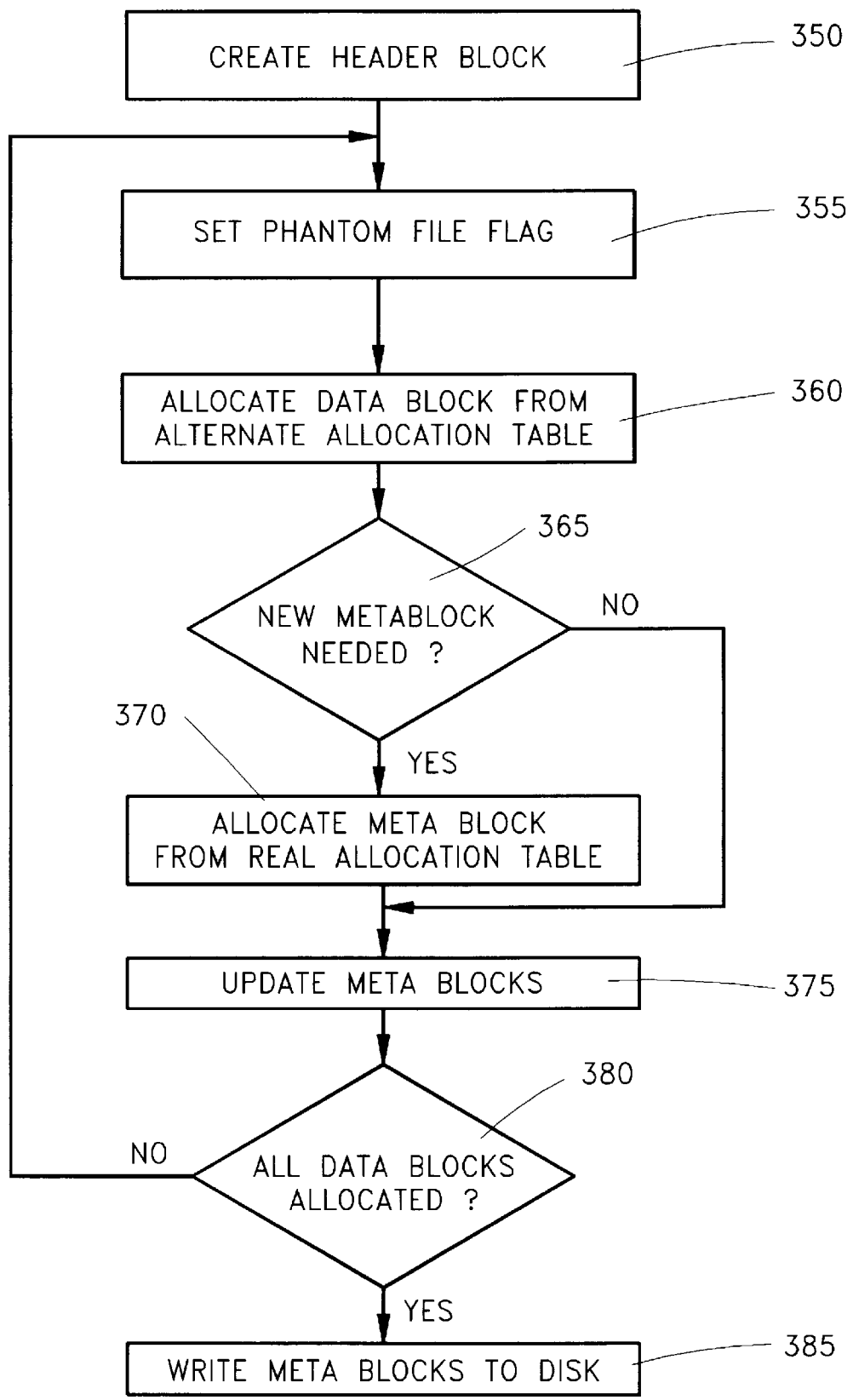
FIG. 3b depicts an example of a method of creating a phantom file and writing it onto the disk(s) in accordance with the present invention.

FIG. 3b depicts an example of a method of creating a phantom file and writing it onto the disk(s) in accordance with the present invention. As depicted, in step 350, create the header block (110) for the phantom file, containing all ordinary file attributes. In step 355, in the header block set a flag marking this file as a phantom file. In step 360, allocate a data block (130) from the alternate allocation table (220). In step 365, determine whether the pointer to this data block can be stored in an already allocated and existing meta block (either the header block (110) or an indirect block (120)) or whether a new indirect block (120) must be allocated. In the former case, proceed to step 375, in the latter case, proceed to step 370. In step 370, allocate a new indirect block (120) from the real allocation table (210) and insert it into the meta block structure. In step 375, update the appropriate meta block by inserting the pointer to the data block (130). In step 380, determine whether there are data buffers left that must be allocated for the phantom file. If this is the case, the process returns to step 360. Otherwise, all data buffers of the phantom file have been allocated disk blocks and the process continues to step 385. In step 385, write the header block (110) and the indirect blocks (120), if any, to disk. Now the operation of creating a new phantom file on disk is complete.

As compared to the prior art method of FIG. 3, the phantom file creation process of the present invention advantageously eliminates both the need to copy data blocks from the user space into the kernel (step 310) and the need to write of data blocks to disk (step 335). These steps are very resource intensive. Their omission substantially speeds up the creation of a phantom file when compared to the creation of a real file under the prior art.

Another advantage to the use of phantom files is that standard system components and algorithms can be used for reading files during the bandwidth measurement process. Therefore, any modifications to the file system for phantom files can occur only on paths used for writing files, i.e., preparing the files that will be read during the measurement or calibration process.

Figure 4:
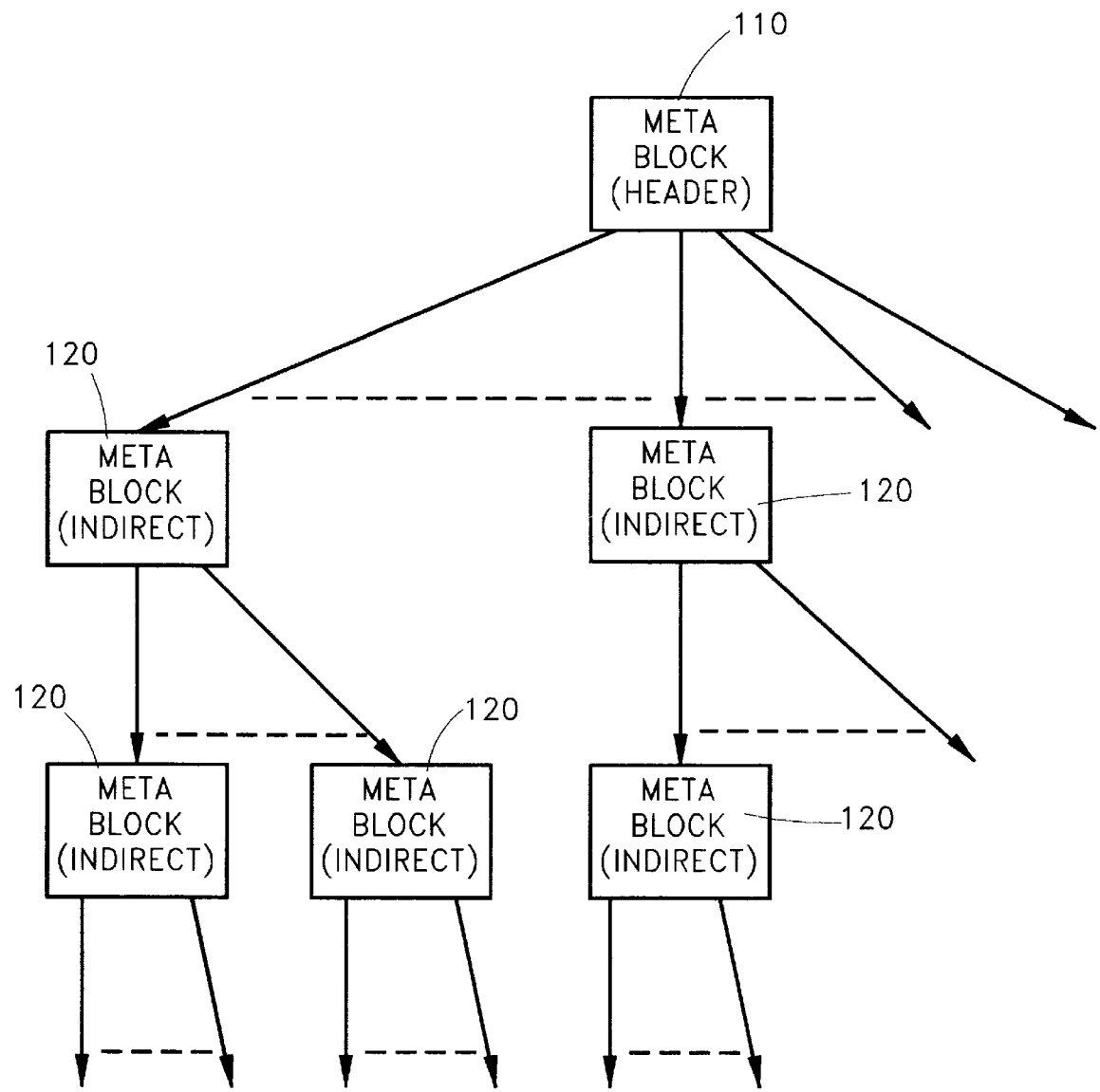
FIG. 4 shows an example of a block structure of the phantom file created by the method of FIG. 3b.

FIG. 4 shows an example of the data block structure of the phantom file created in accordance with the method of FIG. 3b.

Figure 3C:
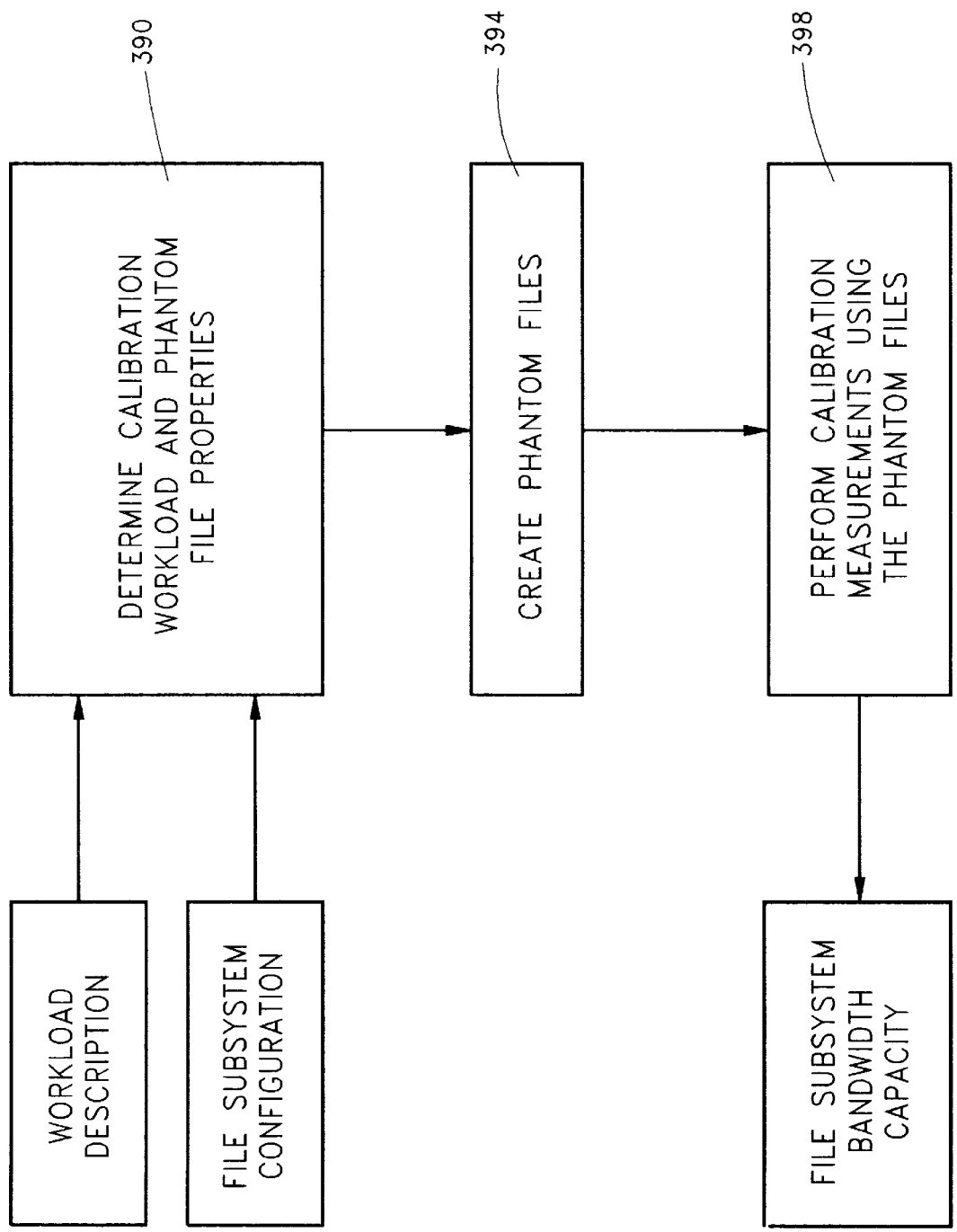
FIG. 3c depicts an example of a method for the bandwidth calibration of a computer system in accordance with the present invention.

FIG. 3c depicts an example of a method for the bandwidth calibration of a computer system in accordance with the present invention. The system has a file subsystem of a particular hardware and software configuration. Examples of disk configurations for the file subsystem will be discussed with reference to FIGS. 5a–5d. The system also has particular expected workload characteristics. An example of a workload description is: video data streams of 3 megabits per second where the video shown by a stream lasts longer than 15 seconds. As depicted, in step 390, based on the workload description and the file subsystem configuration, determine the calibration workload and the properties of the phantom files. Examples of phantom file properties are: the data buffer size, or the amount of data read with one read command; the amount of data, or the length of files as required by the application and as mapped onto the configuration of the disk subsystem; the number of distinct phantom files needed for the calibration process; the degree of file block interleaving; and whether multiple disks are involved (including but not limited to the examples depicted in FIGS. 5b–5d). In step 394, create the phantom files as described in steps 350 through 385. In step 398, the performance measurements are made as required by the intended application.

To measure the bandwidth for a video serving application, for example, the calibration process starts video streams, reading disk blocks representing video data, while maintaining a specified data rate for each video stream. The calibration process increases the number of video streams in the system until the file subsystem can no longer meet the data rate requirements for all the video streams. The highest combined data rate of all video streams, while the data rate requirements are still met, is the maximum bandwidth the file subsystem is capable of. To make this measurement accurate for a given application, the data rate of each stream, and the number of streams must be matched, not just the combined total bandwidth.

FIGS. 5a–5d depict examples of disk configurations wherein phantom files can be used to obtain the bandwidth for file read operations from disk. As depicted, each example contains a system disk (520). As is conventional, the system disk includes a conventional operating system and file system code. It also preferably includes the phantom file logic (FIG. 3b) in accordance with the present invention. The phantom file logic is preferably embodied as software executable on the computer (510). Those skilled in the art will appreciate that the system disk (520) can also comprise a hard disk, a floppy disk, or any other permanent storage device. In all cases, the configuration includes a computer system (called the file system computer (510)) that executes the file system code (510); one or more disks (540, 580); and one or more other conventional components (530, 560, 570) that connect the disks to the file system computer. A preferred file system computer (510) is an IBM RS/6000 computer running an AIX operating system software program, and the Tigershark file system software program, which is a component of the AIX Media Streamer and the AIX Video Charger software program products. All the above products are available from the IBM Corporation, Armonk, N.Y. Those skilled in the art will appreciate, however, that many equivalent systems and configurations are available which fall within the spirit and scope of the present invention.

Figure 5A:
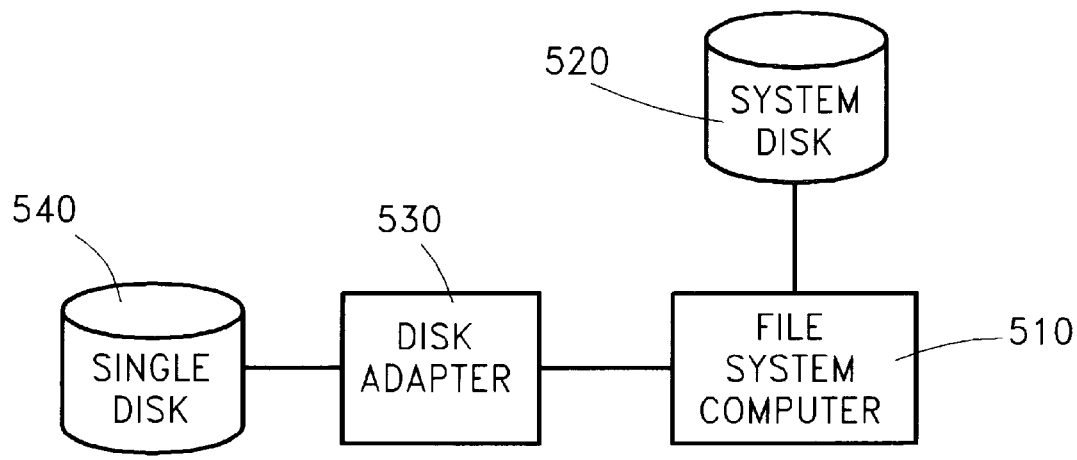
FIGS. 5a–5d depict examples of computer systems and disk configurations wherein phantom files can be used to obtain the bandwidth for file read operations.
Figure 5B:
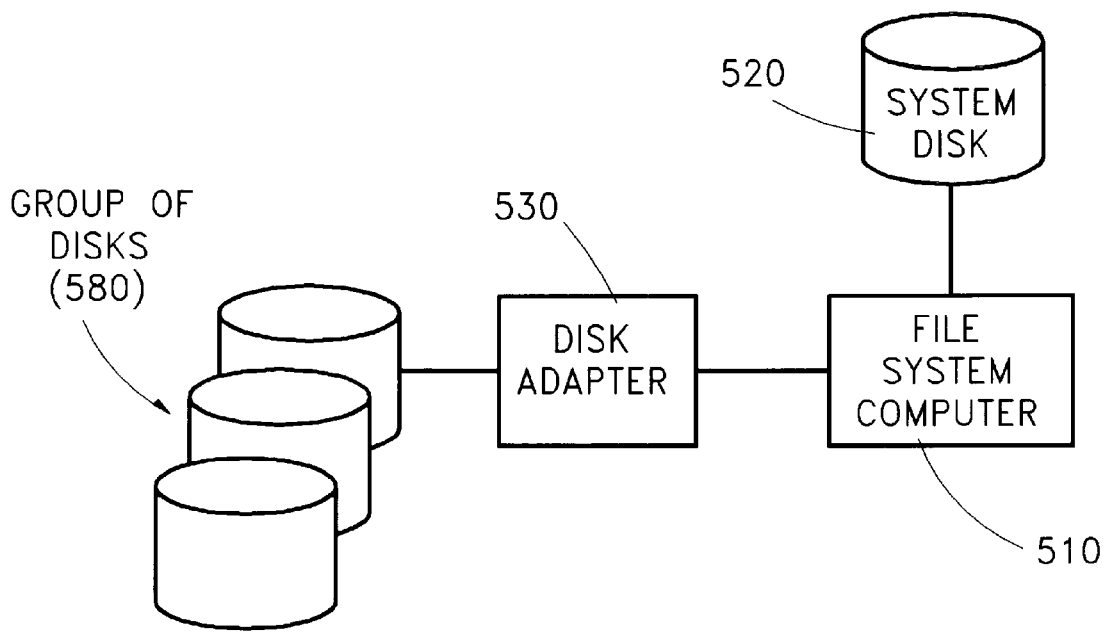
Figure 5C:
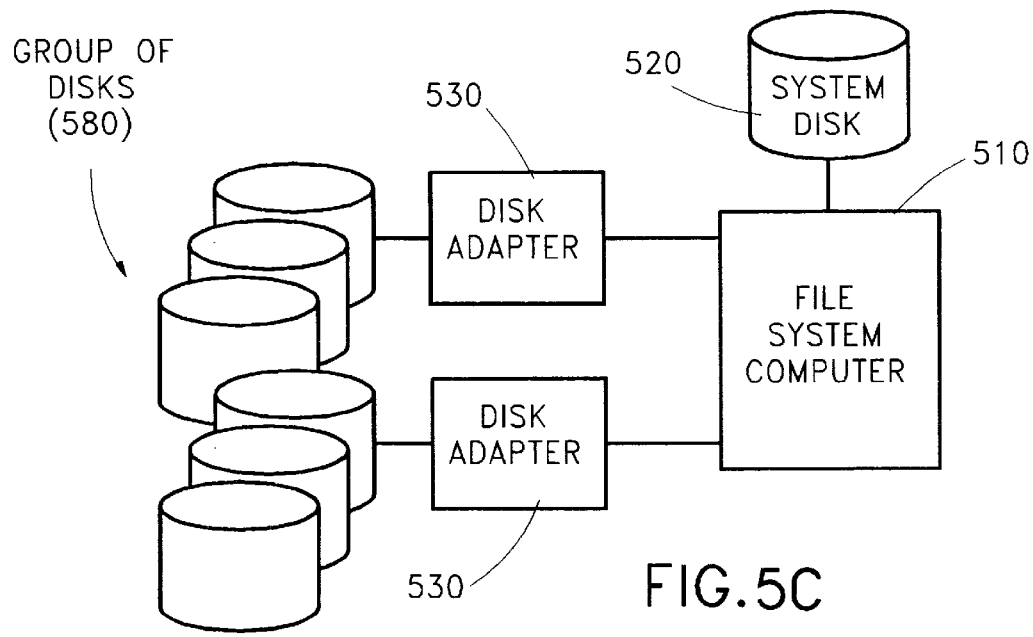
Figure 5D:
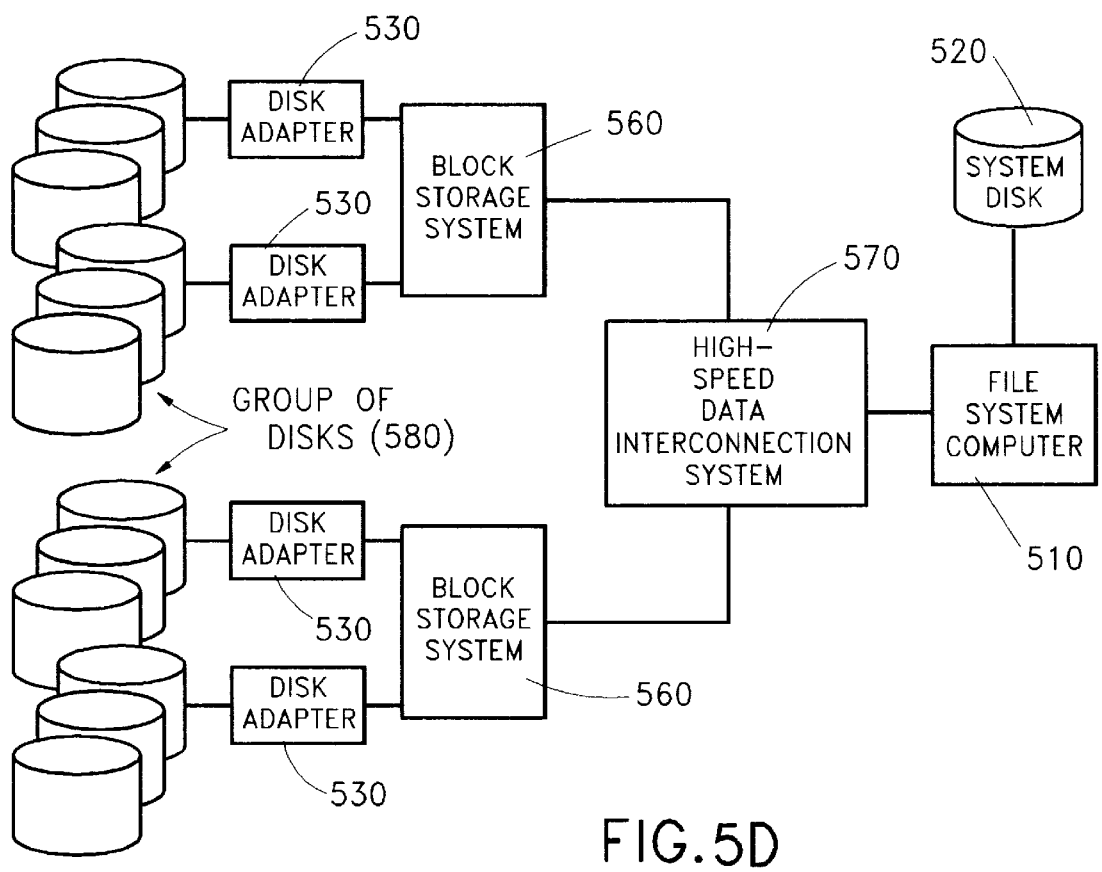

Referring now to FIGS. 5a–5d, a non-exhaustive list of example systems and disk configurations adaptable to the present invention are:

FIG. 5a depicts a file system, and consequently the blocks of a file in that file system, which spans a single disk (540);

FIG. 5b depicts a file system which spans a group of disks (580), attached to a common disk adapter (530); the group of disks can be supported through a RAID adapter, or through an ordinary disk adapter;

FIG. 5c depicts a file system which spans a set of disks (580), attached to the file system computer (510) through multiple disk adapters (530). The disk adapters (530) can be RAID adapters or ordinary disk adapters; and FIG. 5d depicts a file storage system which spans a group of disks (580) that is attached to the file system computer (510) through one or more block storage systems (560) and a high-speed data interconnection system (570). This type of configuration can support the largest number of disks in the disk set. Due to the many components it contains, it is also the most difficult configuration to predict the performance of (with prior art methods). In this case the preferred embodiment uses one processing node of an RS/6000 SP parallel computer for each of multiple file computer systems (510) and for each of multiple block storage systems (560). The RS/6000 SP parallel computer incorporates a high-speed interconnection system (570), connecting all its nodes.

In all cases, the procedure to create the phantom files is as simple as described hereinbefore. Since in all cases the standard execution paths, systems components, and algorithms are being used for reading the phantom files during calibration, the resulting bandwidth results are always accurate and reflect the actual system components being used, rather than some projections based on other system configurations. This is particularly important for increasingly complex system configurations whose bandwidth properties are difficult to predict, such as are depicted in FIGS. 5a–5d, respectively.

Those skilled in the art will appreciate that the read-bandwidth information obtained through the calibration process can be used for any purpose that requires knowledge of the bandwidth a storage subsystem can sustain for read operations. These purposes include, but are not limited to:

supporting quality of service guarantees in real-time systems such as systems supporting the transmission of video and audio files;

supporting service guarantees in data retrieval systems; and making quick assessments of the impact on bandwidth performance of changes in the file system such as different block allocation algorithms.

There are file systems that use an allocation table (210) to keep track of the disk blocks used for files, and infer the disk blocks available for new files. Other file systems use an allocation table (210) to keep track of blocks available for new files, and infer the blocks that are in use by files. Still other file systems keep an address marker to identify the blocks used, and the blocks available for use. In this case, all blocks with addresses below the marker are in use, and the disk blocks with addresses above the markers are unused. Those skilled in the art will appreciate that all these and equivalent file systems fall within the spirit and scope of the present invention. In all cases, there will be a real means (table or marker) of allocating meta blocks and data blocks for ordinary files, and meta blocks for phantom files, and an alternate means (table or marker) to allocate data blocks for phantom files.

Those skilled in the art will also appreciate that certain file system operations may require modification for phantom files; for example, delete operations that de-allocate part or all of a file. The implementation of the file delete system call can be modified so that the meta blocks (the header block (110) and the indirect blocks (120)) of the phantom file are deleted from the real allocation table but data blocks (130) of the phantom file are de-allocated from the alternate allocation table.

Since the read operation of a phantom file retrieves data blocks (130) that may be part of any other file, phantom files can present a security loop hole. To avoid this, the creation and reading of phantom files should be restricted to privileged users, such as system administrators.

Now that the invention has been described by way of a preferred embodiment, with alternatives, various improvements and modifications will occur to those of skill in the art. Thus, it should be understood that the preferred embodiment is provided as an example and not as a limitation. The proper scope of the present invention is defined by the appended claims.

We claim:

1. In a computer system having predetermined workload requirements and disk storage for storing an allocation table including entries for meta blocks and data blocks, a method for dynamically measuring a read bandwidth of a disk, comprising the step of dynamically measuring a read bandwidth of a disk having existing stored user data, without writing new data blocks to the disk.

2. The method of claim 1, wherein the disk stores a substantial amount of user data, further comprising the step of calibrating the disk without modification to the existing stored user data.

3. The method of claim 1, wherein said step of dynamic measuring a read bandwidth of a disk, further comprises the steps of:

creating an alternate allocation table that ignores the existing content of the disk;

creating meta blocks for a phantom file by allocating the meta blocks from the allocation table;

allocating data blocks for the phantom file from the alternate allocation table; and writing meta blocks to the disk, but not said new data blocks.

4. The method of claim 3, further comprising the step of calibrating the disk by reading phantom files using all system components including hardware and software in the same way that the application for which the calibration is intended would read ordinary files.

5. The method of claim 2, said calibrating step further comprising the steps of using any data block on disk for calibration, whether it is empty or whether it is being used by any file on the disk.

6. The method of claim 2, further comprising the step of supporting quality of service guarantees for the transmission of one of audio and video files.

7. The method of claim 2, further comprising the step of supporting quality of service guarantees in a data retrieval system.

8. The method of claim 3, wherein the file system and the blocks of a file in the file system span a single disk.

9. The method of claim 3, wherein the file system spans a set of disks, including a disk array or RAID disk set, attached to a common disk adapter.

10. The method of claim 3, wherein the file system spans multiple disk arrays or RAID sets, attached to multiple disk adapters.

11. The method of claim 3, wherein the file storage system spans several computer systems.

12. A data structure, tangibly embodied in a computer readable memory, according the method of claim 3.

13. A program storage device, readable by a machine, tangibly embodying a program of instructions executable by the machine to perform method steps for supporting a dynamic measurement of the read bandwidth of a disk in a computer system having predetermined workload requirements and including disk storage for storing an allocation table having entries for meta blocks and data blocks, said method steps comprising the step of dynamically measuring a read bandwidth of a disk having existing stored user data, without writing new data blocks to the disk.

14. The program storage device of claim 13, wherein the disk stores a substantial amount of user data, further comprising the step of calibrating the disk without modification to the existing stored user data.

15. The program storage device of claim 13, wherein said step of dynamically measuring of the read bandwidth of a disk, further comprising the steps of:

creating an alternate allocation table that ignores the existing content of the disk;

creating meta blocks for a phantom file by allocating the meta blocks from the allocation table;

allocating data blocks for the phantom file from the alternate allocation table; and writing only meta blocks to the disk, but not said new data blocks.

16. In a computer system having predetermined workload requirements and disk storage for storing an allocation table including entries for meta blocks and data blocks, a method for supporting a dynamic measurement of the read bandwidth of a disk, said method comprising the steps of:

(a) creating a header block for the phantom file including all ordinary file attributes;

(b) setting a phantom file flag the header block set a flag marking this file as a phantom file;

(c) allocating a data block from an alternate allocation table;

(d) determining whether a pointer to the data block can be stored in the header block or an indirect block or whether a new indirect block must be allocated;

(e) if a pointer to the data block can be stored in the header block or an indirect block, updating the header block or the indirect block by inserting the pointer to the data block;

(f) if a pointer to the data block cannot be stored in the header block or an indirect block, allocating a new indirect block from the real allocation table and insert it into the meta block structure;

(g) iterating steps (c) through (f) until all data blocks have been allocated; and (h) writing the header block and any indirect blocks, to disk.

* * * * *